Figure 1:
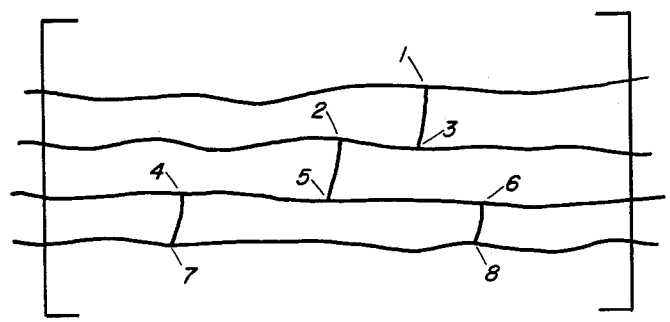

INVENTOR.
MARY L. MILLER
BY Arthur J. Plantamura

United States Patent Office 3,021,269
Patented Feb. 13, 1962

3,021,269
PREPARATION OF BRANCHED POLYMERS
Mary L. Miller, New York, N. Y., assignor to American Cyanamid Company, New York, N.Y., a corporation of Maine
Filed June 5, 1957, Ser. No. 663,594
7 Claims. (Cl. 204—154)

This invention relates to branched polymers having a relatively high order of branching. More particularly, the invention relates to a method of making polymers of this type wherein vinyl polymers and copolymers which are moderately cross-linked are subjected to high frequency sound waves thereby mechanically breaking the cross-linking to form pendent groups or branches on the polymer.

Within the contemplation of the invention, a branch polymer is one having a "backbone" or trunk of a polymer with a plurality of side chains or "branches" of the same polymer. In this type of arrangement, both the backbone and branches consist of similar monomer units and includes not only homopolymers with branching but also random copolymers with branching.

Properties of branch polymers are appreciably different from ordinary or random homopolymers constituted from the same monomers. Branched homopolymers and ordinarily random branched copolymers have various intermediate properties distinguishing them from their respective polymers which contain no significant branching in their structures.

There has been considerable difficulty in the prior art technique in attempts to prepare high molecular weight polymers with a highly ramified branched structure due to the fact that in attempting to increase the extent of branching the polymer cross-links to the insoluble gel stage. The result has been that the formation of this type polymer including both branched and graft polymers has been somewhat limited to the formation of polymers with a relatively few long branches per molecule produced generally by a chain transfer technique. Where attempts to make a more highly branched polymer have been made, the usual result has been a cross-linked insoluble material.

According to the present invention, I have found that a relatively high molecular weight polymer with a highly ramified branched structure may be achieved by first forming a cross-linked gel and then severing the cross-linking in the polymer to form a branched soluble polymer by treatment of the cross-linked polymer with sound waves, i.e., high frequency compressional waves in the sonic and ultrasonic range. I have discovered that this treatment is also effective in making graft polymers, i.e., subjecting a copolymer which consists of a gel of graft polymers to high frequency sound waves.

It is the object of the present invention to prepare a polymer having a highly ramified branched structure by transforming the linking in a cross-linked gel into a branched structure. More particularly, it is the object of the present invention to make a highly branched polymeric material by subjecting a cross-linked vinyl polymer to a treatment with high frequency sound waves in order to transform the cross-linking into a branched structure.

Further objects and advantages of the present invention will become apparent from the detailed description set forth below.

According to the invention, cross-linking of the polymer or copolymer is effected so that an initially insoluble polymer gel, preferably having a moderate degree of cross-linking, is obtained. The polymer is then subjected to high frequency sound waves which causes the random breakdown of the polymer cross-linking resulting in a soluble branched polymer. It will be understood that "soluble polymer" refers to a polymer which forms a true solution in which the molecules are individually dispersed.

Figure 2:
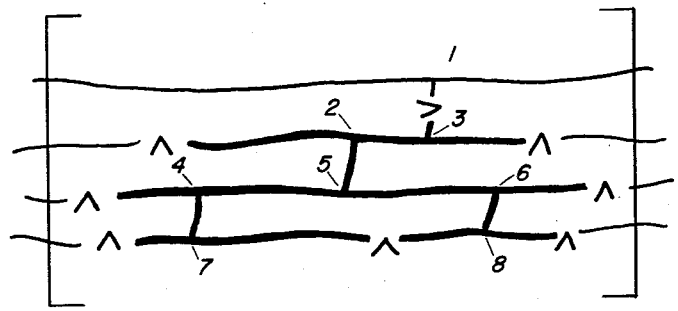

As illustrated by the figures of the drawing, FIG. 1 shows diagrammatically a cross-linked gel and FIG. 2 shows, also diagrammatically, the degradation product of the gel of FIG. 1 wherein the cross-linked structure of the polymer gel is substantially severed after the treatment with high frequency sound waves. The numerals 1—8 in FIG. 1 of the drawing designate the trifunctional branch points of the cross-linked insoluble polymer. The same points are shown in FIG. 2, wherein the structure of the insoluble gel has been severed at the points represented by the symbol "∧" to produce a highly branched soluble polymer, a molecule of which is, for better clarity, represented in FIG. 2 by the heavy lines.

The wave frequencies which may be employed in treating the polymer are those in the sonic region, i.e., having a vibration of at least 5 kilocycles, and including as well those frequencies in the ultrasonic region, for example, frequencies in the neighborhood of 20 kilocycles or higher. In order to obtain the most highly branched structure, the treatment is continued until substantially all of the gel has dissociated. A more prolonged treatment may for some purposes be undesirable as it tends to break down the branched polymer, thereby lessening the number of branches on the molecule.

The monomeric material which may be employed in the formation of the polymers and copolymers employed in the process of this invention are those which contain the characteristic $CH_2=C<$ grouping and have the general formulas:

(a) 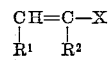

and (b) 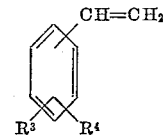

wherein $R^1$, $R^2$, $R^3$ and $R^4$ are substituents selected from the group consisting of hydrogen, methyl and ethyl and X is a substituent selected from the group consisting of CN, $CONH_2$, COOH, OH and $OR^5$ wherein $R^5$ is an alkyl radical of 1 to 4 carbon atoms. Compounds of this type include acrylic and substituted acrylic acids and their esters, nitriles and amides, such as acrylic acid, methacrylic acid, methyl acrylate, ethyl acrylate, methyl methacrylate, ethyl methacrylate, butyl methacrylate, methyl ethacrylate, acrylonitrile, methacrylonitrile, acrylamide, methacrylamide; the vinyl alcohols and the like. Examples of compounds containing the aromatic radical are aryl olefins, such as styrene and various alkyl styrenes, such as methyl, dimethyl styrene and ethyl styrene.

Cross-linking or formation of gels of these polymers may be effected by known means such as by employment of small amounts of difunctional monomers as cross-linking agents or by subjecting the material to conditions which promote cross-linking such as X-rays, gamma rays, neutrons or by chemical reactions, such as esterification and amidation. Various known cross-linking agents may be employed for this purpose, such as divinyl benzene, diacrylamide, methylene bisacrylamide, acrylic acid anhydride, methylene glycol diacrylate, triallyl cyanurate and diallyl phthalate for example.

The amounts of cross-linking agents is not critical; however, for practical considerations, the amount thereof is preferably controlled so that cross-linking is moderate rather than extreme. I have found that amounts of cross-linking agents of between 0.0001 to 5 mole percent based on the monomer may be employed, preferably the amount used is within the range of about 0.005 to 0.5 mole percent of the monomeric or polymeric material employed. With lesser amounts, the cross-linking and ultimately the branching is reduced to a very low proportion whereas with higher amounts the time required for degradation of the cross-linked polymer may be excessive and economically impractical.

In order to provide the most highly branched structure the treatment of the gel with high frequency sound waves is terminataed at a stage where the presence of gel has substantially disappeared. The small amounts of gel which may remain is removed by suitable methods as by filtration or sedimentation.

This process of the present invention is to be distinguished from the use of sound waves, either sonic or ultrasonic, to hasten the solution of materials, including polymers. In those instances, the materials treated are soluble and would eventually go into solution on continued stirring or heating. The cross-linked polymeric gels treated according to the invention will not go into solution prior to treatment by heating or stirring. The material is made soluble only by a treatment whereby the chemical bonds of the cross-link structure are broken in order to convert the gel to smaller molecules. As described herein, the high frequency sound treatment breaks these bonds.

The process is also to be distinguished from the use of ultrasonics to break polymers already in solution (i.e., polymers which are not in fact cross-linked) into smaller molecules. The treatment of solutions as such is not within the contemplation of the present invention. The gels treated in the process of the invention have an almost infinite molecular weight and are insoluble prior to being degraded by treatment with sound waves.

The present invention is furthermore to be distinguished from the use of ultrasonics to aid dispersion of materials such as in the preparation of emulsions. Processes for preparing emulsions do not require the breaking of chemical bonds. The material in the emulsion particle remains substantially insoluble in the suspending medium.

Any of the various available apparatus may be employed to treat the cross-linked polymers according to the invention, such as a Raytheon ultrasonic generator unit, Model S102A or a quartz crystal ultrasonic wave generator for example. The frequency employed may vary from sonic waves having a frequency of at least about 500 cycles per second to ultrasonic frequencies. High frequency sound waves as the term is used herein include frequencies within the audible range, i.e., up to about 20,000 cycles per second as well as ultrasonic waves having frequencies above the audible range, i.e., above about 20,000 cycles per second and to about 10 megacycles and above. Generally, it is preferable to use frequencies of at least 8 kilocycles and ordinarily, no particular advantage is derived in using frequencies above about 10 megacycles.

The temperature employed during the treatment is not critical and may vary from 0° C. to about 100° C. whenever the more extreme temperatures do not have an adverse effect, such as discoloration for example, on the polymer. Room temperatures may be employed and generally temperatures in the range of between about 10° C. and 70° C. are suitable for most purposes.

In order that the invention and its advantages may be further illustrated, the following examples are set forth. Results obtained are summarized in the tables which follow. The reactants and their proportions and conditions described are typical and should not be construed as limiting the invention except as set forth hereinafter in the claims. Unless otherwise expressly stated, the parts and percentages stated are by weight.

EXAMPLE 1

A lightly cross-linked gel of polyacrylamide is prepared with the ingredients and procedure as follows:

58 parts of water (boiled $O_2$ free)
8 parts acrylamide
5 parts catalyst A[1]
5 parts catalyst B[2]
8 parts solution C[3]

1—Catalyst A is 0.30 part ammonium persulfate in 50 parts of water.
2—Catalyst B is 0.06 part of sodium metabisulfite in 50 parts of water.
3—Solution C is 0.04 part methylene bisacrylamide in 50 parts of water.

The above ingredients are introduced into a vessel, cooled to 0 to 2° C., mixed and retained under refrigeration overnight. The supernatant is decanted from the gel that forms in the vessel. The gel is added to two times its volume of water, broken up in a blender and after settling, is decanted. The gel is washed three times this way, then added to an equal volume of water. The mixture is treated with a Raytheon ultrasonic generating unit Model S102A at 30° C. The setting is 9 kilocycles at 80 volts and approximately 0.6 of its maximum power. After an hour, 87% of the gel is broken up. The product is filtered and the intrinsic viscosity determined and found to be 1.50. This intrinsic viscosity, the significance of which will hereinafter be considered, corresponds to an apparent molecular weight of 300,000 for an unbranched polymer and to a much higher melocular weight for a branched polymer.

EXAMPLE 2

A lightly cross-linked gel of polyacrylic acid is prepared as follows: 125 parts water (boiled $O_2$ free), 15 parts of acrylic acid, 10 parts each of catalysts A and B of Example 1, and 0.013 part of methylene bisacrylamide are mixed cold in a vessel and kept overnight under refrigeration. The gel is washed and dispersed as in Example 1 and subjected to ultrasonic degradation with the Raytheon unit set at a higher power than in Example 1, i.e., at a plate voltage of 135 and output voltage of 98 for 1 hour and 55 minutes. The product is filtered twice. The solution, which is crystal clear, is freeze dried. The intrinsic viscosity of the polymer determined (after neutralization) in 1 N $NaNO_3$ is 1.25. This viscosity corresponds to an apparent molecular weight of 250,000 for linear polymer.

EXAMPLE 3

The procedure of Example 2 is repeated with the exception that a greater amount of cross-linking agent, methylene bisacrylamide, i.e., 0.0375 part, is employed. The product is subject to high frequency sound waves in water for 5 hours and 25 minutes. The product has an intrinsic viscosity of 2.54 and an "apparent molecular weight" of 630,000.

EXAMPLE 4

To 20 parts of styrene is added 0.03 part of divinyl benzene, and 0.19 part of benzoyl pexoride. The mixture is sealed from the atmosphere and retained at a temperature of 100° C. for three days. The polymer obtained is swelled in toluene overnight. The polymer swells to about 6 times its volume but does not dissolve. The swollen gel is washed three times with toluene, treated with sonic vibrations in the order of 9 kilocycles for 3 hours and 10 minutes. At the end of this time, only a few flecks of gel remain undissolved. The soluble polymer product is filtered from the remaining gel particles. It has an "apparent molecular weight" of 325,000.

EXAMPLE 5

A lightly cross-linked gel of polyacrylonitrile is prepared as follows: 234 parts of water, 16 parts of acrylamide, 9 parts each of the catalysts A and B of Example 1 and 0.04 part of methylene bisacrylamide are introduced into a reaction vessel and stirred at 30° C. for 2 hours. At the end of the 2 hours, the mixture is poured into methanol to coagulate the polymer. The polymer is filtered off, washed 2 times by slurrying in water, and air dried for 16 hours. 10 parts of the polymer are added to 100 parts of dimethyl formamide. The polymer swells but does not dissolve.

The suspenson is treated with ultrasonics at 9 kilocycles for 1 hour. A small amount of residual gel was filtered off. The soluble polymer has an intrinsic viscosity of 0.75 and an "apparent molecular weight" of 50,000.

EXAMPLE 6

125 parts of water (boiled $O_2$ free), 15 parts of polyacrylamide, 10 parts each of catalysts A and B of Example 1 and 0.013 part of diacrylamide are introduced cold into a suitable vessel, mixed and refrigerated overnight. The resulting gel is washed and treated to ultrasonic gradation according to the procedure of Example 2. The product is filtered twice and gives a crystal clear solution which is freeze dried. The product gives an intrinsic viscosity in 1 N $NaNO_3$ of 2.00 corresponding to an apparent molecular weight of 470,000.

The data for Examples 1–6 is summarized in Table 1.

*Table I*

| Example | Polymer | Suspending Medium | Time | Intrinsic Viscosity | Apparent Molecular Weight |
|---|---|---|---|---|---|
| 1 | Polyacrylamide | Water | 1 hour | 1.5 | 300,000 |
| 2 | Polyacrylic acid | do | 1 hr., 55 min | 1.25 | 250,000 |
| 3 | do | do | 5 hrs., 25 min | 2.54 | 630,000 |
| 4 | Polystyrene | Toluene | 3 hrs., 10 min | 1.54 | 325,000 |
| 5 | Polyacrylonitrile | Dimethylformamide | 1 hour | 0.75 | 50,000 |
| 6 | Polyacrylamide | Water | 2 hours | 2.00 | 470,000 |

The following examples deal with copolymers. Examples 7 and 8 are illustrative of use of the invention to prepare branched random copolymers and Example 9 a graft copolymer.

EXAMPLE 7

15.7 parts of acrylamide and 0.32 part of acrylic acid are introduced into a suitable reaction vessel together with 125 parts of water (boiled $O_2$ free), 10 parts each of catalyst A and B of Example 1, and 0.013 part of methylene bisacrylamide as cross-linking agent. The components are mixed cold and allowed to stand overnight and refrigerated. The gelled copolymer is subsequently treated in the manner described for the product of Example 2. Data for the material of Example 7 is set forth in Table II.

EXAMPLE 8

The procedure of Example 7 is repeated with the exception that the monomer proportions employed are 11.2 parts of acrylamide and 4.8 parts of acrylic acid. Data for Example 8 is shown in Table II.

EXAMPLE 9

A gel consisting of chains of polyacrylamide grafted to chains of polyacrylic acid by ester linkage so as to form a gel as prepared as follows:

50 parts of water
2 parts acrylamide
0.1 part polyvinyl alcohol
0.040 part potassium persulfite The ingredients are mixed and heated at 80° C. for 1 hour. The reaction product is polyacrylamide containing some polyvinyl alcohol grafted on by chain transfer. 2 parts acrylic acid and 0.08 part potassium persulfate are added to the above polymeric reaction product and heated for 1 hour more. The temperature of the mass is then raised and maintained at 100° C. and water is evaporated until the mass sets up to a gel. This gel is found to swell in water but does not dissolve. The gel is added to about two times its volume of water and mechanically broken up in a Waring Blendor. The suspension is treated with ultrasonics at a frequency of 9 kilocycles for 2 hours and 10 minutes. The product is filtered. The solution which is clear contains soluble graft copolymer whose composition is 25% acrylic acid and 75% acrylamide. This polymer has an intrinsic viscosity of 0.56 and an apparent molecular weight of 100,000.

*Table II*

| Example | Polymer | Solvent | Degradation Time | Intrinsic Viscosity | Apparent Molecular Weight |
|---|---|---|---|---|---|
| 7 | Random copolymer: 2% acrylic acid, 98% acrylamide. | Water | 5 hrs., 40 min | 1.15 | 165,000 |
| 8 | Random copolymer: 30% acrylic acid, 70% acrylamide. | do | 2 hours | 1.05 | 160,000 |
| 9 | Graft copolymer: 25% polyacrylic acid, 75% polyacrylamide.[1] | do | 2 hrs., 10 min | 0.56 | 100,000 |

[1] As analyzed by infrared spectroscopy.

A measurement of the viscosities of solutions of polymeric material obtained according to the invention is employed in ascertaining the apparent molecular weight of the polymers. The term "apparent molecular weight" herein connotes the molecular weight of a linear polymer having the same intrinsic viscosity as that found for the branched polymer.

It is known that a branched polymer having a given viscosity has a considerably higher molecular weight than a linear copolymer of the same viscosity. Experimental confirmation may be found in various publications. See, for example, C. D. Thurmond and B. H. Zimm, J. Polymer Science, vol. 8, page 477 (1952) and Zimm, B. H. and Stockmayer, W. M., J. Chemical Phys., 17, 1301 (1945).

Although the method of preparation herein utilized and described will clearly indicate the formation of branched polymers, actual measurement on the following prepared according to the invention shows that a branch polymer actually is obtained.

To estimate the number of branches in these polymer preparations, it is necessary to measure the intrinsic viscosity and the weight average molecular weight by light scattering technique. The procedure used is illustrated on a sample of the polyacrylic acid prepared by the method of Example 2 with the exception that 0.04 part of methylene bisacrylamide were used instead of 0.013 part. The molecular weight measured by light scattering in dioxane solution was $4.7 \times 10^5$. The intrinsic viscosity, also measured in dioxane, was 0.38.

Reference to data in the literature (S. Newman, W. R. Krigbaum, C. Laugier and P. J. Flory, J. Polymer Sci. 14, 451 (1954) shows that a linear polymer with this molecular weight would have an intrinsic viscosity of 0.59. Therefore, the ratio of viscosity of the branched polymer to that of a linear polymer of the same molecular weight is 0.65. Tables given in the literature (Zimm, B. H. and Stockmayer, W. M., J. Chem. Phys., 17, 1301 (1945) shows that this ratio corresponds to 3.5 trifunctional branches.

It will be apparent that the present invention sets forth a novel technique for the preparation of branched and graft polymers characterized by a highly branched structure.

The soluble polymers herein described and prepared are useful in various applications where polymeric material is employed and in particular where a high molecular weight polymer with low viscosity is desirable. Examples of such applications are in the preparation of synthetic fibers and surface films; uses where the adsorption of the polymer is involved such as for paper and textile finishing; and in settling of muds and ores.

I claim:

1. A method of preparing a branched polymer which comprises cross-linking polymers of compounds selected from the group consisting of those having the general formulas (a)
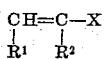

and (b)
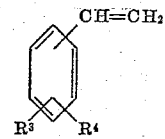

wherein $R^1$, $R^2$, $R^3$ and $R^4$ are substituents selected from the group consisting of hydrogen, methyl and ethyl, and X is a substituent selected from the group consisting of $-CN$, $-CONH_2$, $-COOH$, $-OH$ and $-OR^5$ wherein $R^5$ is an alkyl radical of 1 to 4 carbon atoms, and copolymers thereof, to a polymeric gel and subjecting said polymeric gel to high frequency sonic waves having frequencies between 5 kilocycles and 10 megacycles until the cross-linked polymeric gel is substantially dissociated thereby producing a branched chain polymer.

2. A method of preparing a branched polymer which comprises cross-linking polymers of compounds selected from the group consisting of those having the general formulas (a)
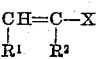

and (b)
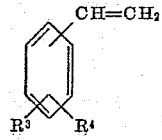

wherein $R^1$, $R^2$, $R^3$ and $R^4$ are substituents selected from the group consisting of hydrogen, methyl and ethyl, and X is a substituent selected from the group consisting of $-CN$, $-CONH_2$, $-COOH$, $-OH$ and $-OR^5$ wherein $R^5$ is an alkyl radical of 1 to 4 carbon atoms, and copolymers thereof, to a polymeric gel and subjecting said polymeric gel to high frequency sonic waves having frequencies between about 8 kilocycles and 10 megacycles until the cross-linked polymeric gel is substantially dissociated thereby producing a branched chain polymer.

3. A method of preparing a branched polymer which comprises cross-linking polyacrylamide to a polymeric gel and subjecting said polymeric gel to high frequency sonic waves having frequencies between about 8 kilocycles and 10 megacycles until the cross-linked polymeric gel is substantially dissociated thereby producing a branched chain polymer.

4. A method of preparing a branched polymer which comprises cross-linking polyacrylonitrile to a polymeric gel and subjecting said polymeric gel to high frequency sonic waves having frequencies between about 8 kilocycles and 10 megacycles until the cross-linked polymeric gel is substantially dissociated thereby producing a branched chain polymer.

5. A method of preparing a branched polymer which comprises cross-linking polyacrylic acid to a polymeric gel and subjecting said polymeric gel to high frequency sonic waves having frequencies between about 8 kilocycles and 10 megacycles until the cross-linked polymeric gel is substantially dissociated thereby producing a branched chain polymer.

6. A method of preparing a branched polymer which comprises cross-linking polystyrene to a polymeric gel and subjecting said polymeric gel to high frequency sonic waves having frequencies between about 8 kilocycles and 10 megacycles until the cross-linked polymeric gel is substantially dissociated thereby producing a branched chain polymer.

7. A method of preparing a branched polymer which comprises cross linking an acrylamide-acrylic acid copolymer to a polymeric gel and subjecting said polymeric gel to high frequency sonic waves having frequencies between about 8 kilocycles and 10 megacycles until the cross-linked polymeric gel is substantially dissociated thereby producing a branched chain polymer.

References Cited in the file of this patent

FOREIGN PATENTS

| 611,830 | Great Britain | Nov. 4, 1948 |
| 499,577 | Canada | Jan. 26, 1954 |

OTHER REFERENCES

Szalay: "Z. Physik Chem.," A 164, pages 234–240 (1933).

Weissler: "Am. Inst. for Chem. Engineers Symposium," vol. 47, pp. 22–27 (1951).

Schmid: "Z. Physik Chem.," vol. 186A, p. 113 (1940).

Journal of Polymer Science, 9 (1952), page 265.

UNITED STATES PATENT OFFICE
CERTIFICATE OF CORRECTION

Patent No. 3,021,269                             February 13, 1962

Mary L. Miller

It is hereby certified that error appears in the above numbered patent requiring correction and that the said Letters Patent should read as corrected below.

Column 5, lines 24 and 25, for "gradation" read -- degradation --.

Signed and sealed this 10th day of July 1962.

(SEAL)
Attest:

ERNEST W. SWIDER
Attesting Officer

DAVID L. LADD
Commissioner of Patents